No. 612,540. Patented Oct. 18, 1898.
R. BRANDT & A. OERTEL.
SAFETY BRAKE FOR ELEVATORS.
(Application filed June 6, 1898.)
(No Model.) 2 Sheets—Sheet 2.

ATTEST.
INVENTORS.
Reinhold Brandt
August Oertel
BY W. F. Fisher ATTY

UNITED STATES PATENT OFFICE.

REINHOLD BRANDT AND AUGUST OERTEL, OF CLEVELAND, OHIO.

SAFETY-BRAKE FOR ELEVATORS.

SPECIFICATION forming part of Letters Patent No. 612,540, dated October 18, 1898.

Application filed June 6, 1898. Serial No. 682,684. (No model.)

*To all whom it may concern:*

Be it known that we, REINHOLD BRANDT and AUGUST OERTEL, citizens of the United States, residing at Cleveland, in the county of Cuyahoga and State of Ohio, have invented certain new and useful Improvements in Automatic Safety-Brakes for Elevators; and we do declare that the following is a full, clear, and exact description of the invention, which will enable others skilled in the art to which it appertains to make and use the same.

Our invention relates to automatic safety-brakes for elevators; and the invention consists of the construction as hereinafter shown and described, and more particularly pointed out in the claim.

Figure 1:
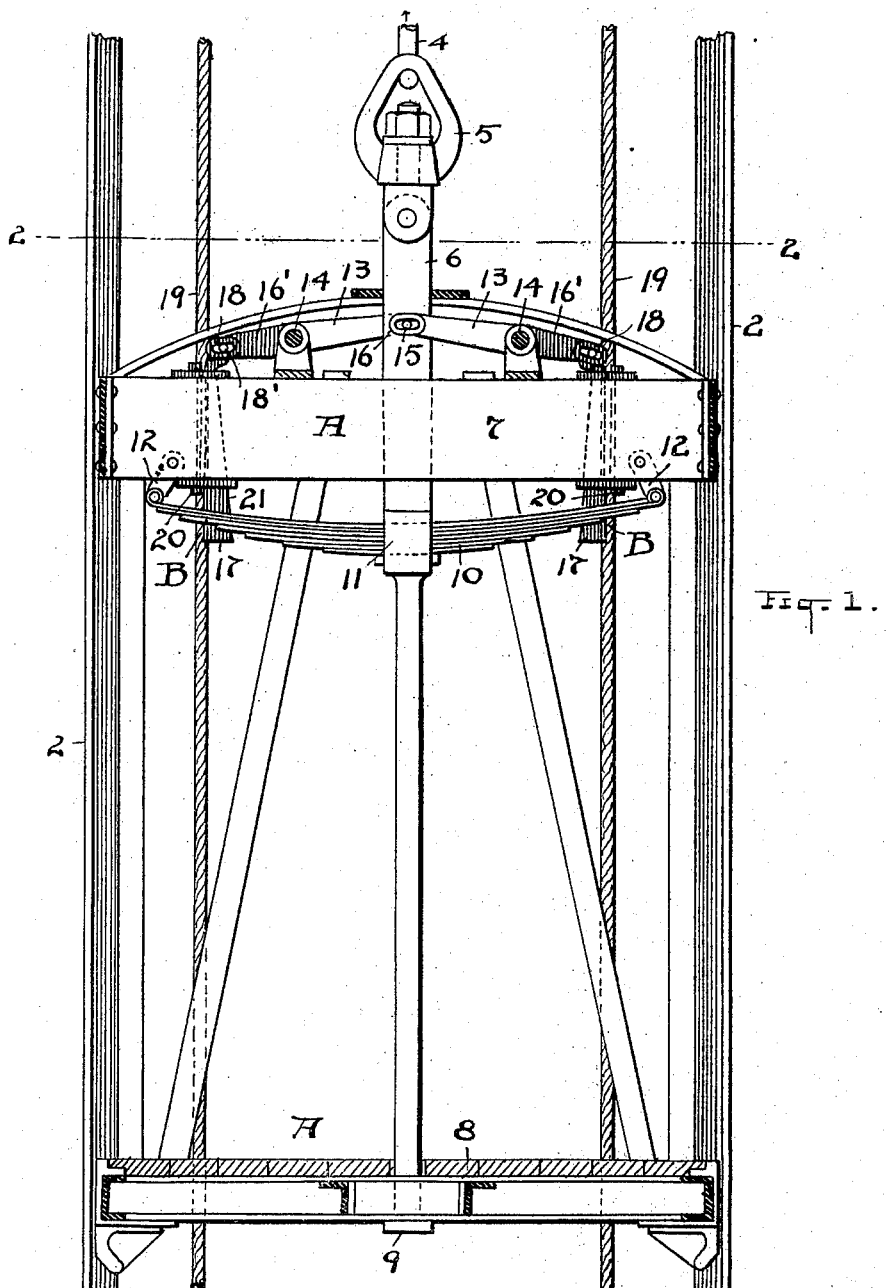
Figure 2:
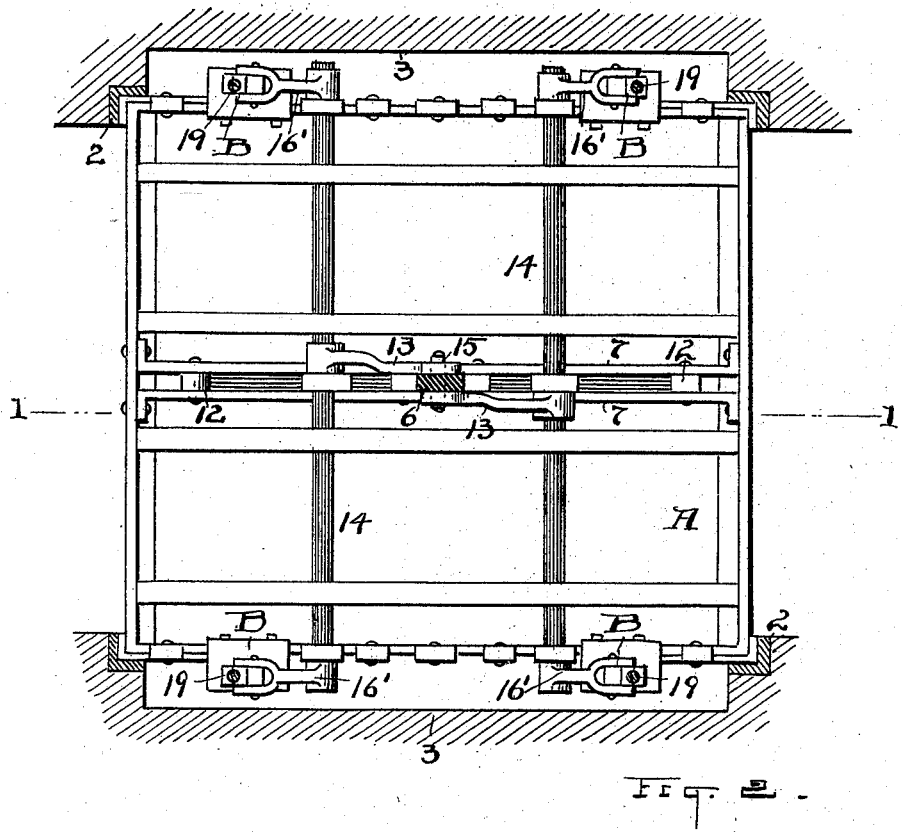
Figure 3:
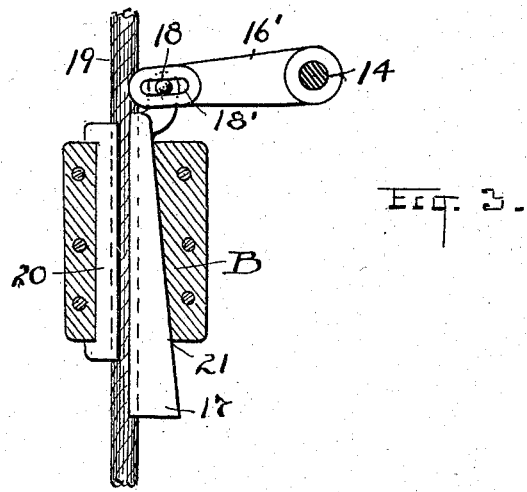

Figure 1 is a central longitudinal section, on line 1 1, Fig. 2, of the elevator-car and its attachments. Fig. 2 is a plan view looking down from line 2 2, Fig. 1. Fig. 3 is a detail sectional view of one of the brakes and its cable.

In the accompanying drawings, A represents the frame of an elevator-car which is designed more especially for use in mines and underground work, and this frame travels in guides 2, attached to the walls 3 of the shaft. Suitable power connection (not shown) serves to raise and lower the car by means of the cable 4, attached to the swiveled bolt 5, at the top and center of the same. Connected to this bolt 5 is a bar 6, which passes down between two cross-beams 7 to the floor 8 below, where an enlargement 9 at the end of the bar serves to support and carry the car. A strong bow-spring 10 passes through the bar 6 at 11, and links 12, pivoted between beams 7, support the ends of the spring. The bar 6 is free to slide in the frame A; but when in its normal position, as seen in Fig. 1, the bar is held up against the tension of the spring 10, and the weight of the car serves to keep this tension of the spring the same as long as the cable 4 is whole and taut; but as soon as the cable breaks spring 10 exerts its force and presses bar 6 down. This downward movement of bar 6 is utilized to operate friction-brakes B at each side of the car and is accomplished by means of rock-arms 13, supported on separate shafts 14, located at each side of bar 6 and at the top of frame A. Pin 15 on bar 6 engages the arms 13 through lateral slots 16 in the end of the same. At each end of shafts 14, which project beyond each side of frame A, are arms 16', which are connected to the wedge-shaped friction-blocks 17 by lugs 18, riding in the slots 18' in the end of said arms. A downward movement of rock-arms 13 partially rotates shafts 14 and raises the ends of arms 16' and wedges 17. Friction-cables 19, running parallel with guides 2 the full length of the shaft, are fastened at the top and bottom of the shaft in any suitable way, and each cable passes between a wedge 17 and stationary shoe 20 on the frame A. As the wedge is raised by the mechanism heretofore described the inclined surface 21 forces the parallel faces of the shoe and wedge nearer together and grips the cable 19, which lies between them. A slight movement is all that is necessary to bring the faces in contact with the cable, and when the car falls the wedge will automatically grip the cable more and more as the friction thereon becomes greater and until the car finally stops. These gripping-cables are four in number and are located at the sides of the car and do not pass through them to limit the floor-space of the car. By having four of these cables arranged two on each side of the car an equal strain is imposed upon each and a uniform action is had, which governs the descent of the car without lurching and racking of the same and its guides as it comes to a sudden stop. The advantage of having four cables, arranged as described, with brake mechanism for each cable operated simultaneously, is apparent when one considers the enormous strain imposed upon the cables when the car is brought to a sudden stop. A uniform distribution of the strain must be obtained to prevent the weight of the car and its cargo from snapping the cables.

What we claim as new, and desire to secure by Letters Patent, is—

A safety-brake for elevator-cars comprising a set of four fixed cables equally arranged at opposite sides of the car and friction wedges and shoes on said car engaging said cables, cross-shafts and arms on said shafts to operate said wedges, and a central bar to support said car by means of a hoisting-cable, rock-arms on said cross-shafts connected to said bar, and a spring supported on said car to move said bar downward when the hoisting-cable is broken, substantially as described.

Witness our hands to the foregoing specification this 21st day of April, 1898.

REINHOLD BRANDT.
AUGUST OERTEL.

Witnesses:
H. T. FISHER,
R. B. MOSER.